(No Model.)
W. C. WOOLLEY & D. BEHMER.
PRUNING SHEARS.
No. 393,197. Patented Nov. 20, 1888.
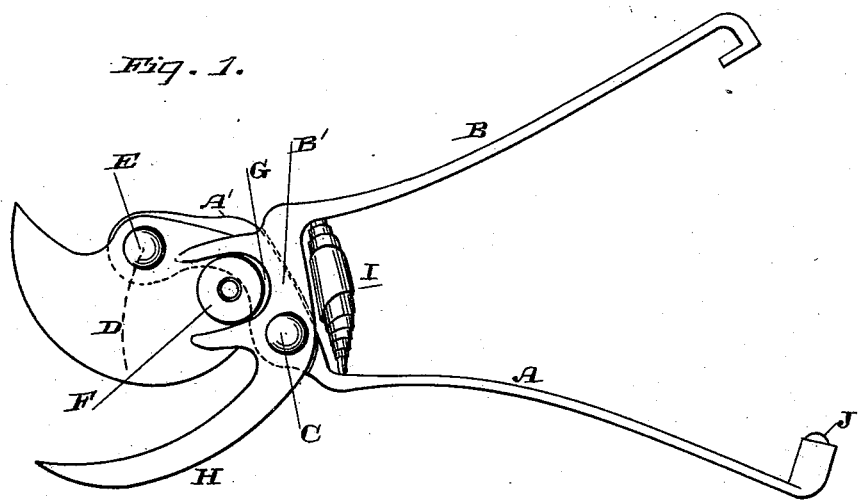
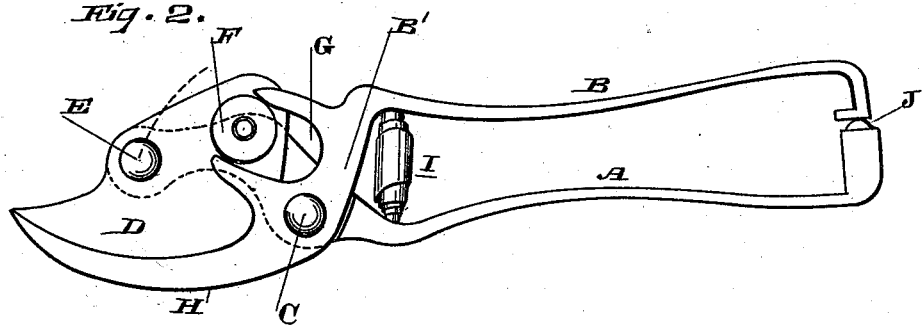
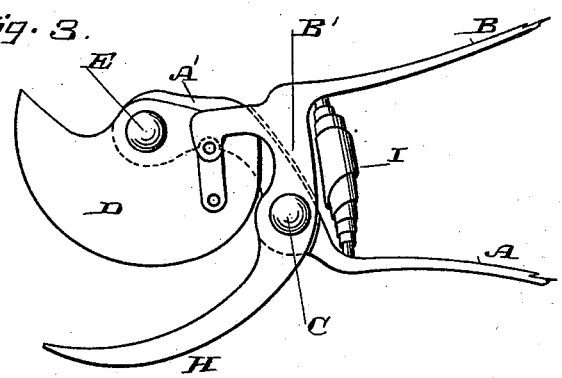
Witnesses,
Geo. H. Strong.
J. H. Strong
Inventors,
Wm. C. Woolley
Danl. Behmer
By Dewey & Co.
attys

UNITED STATES PATENT OFFICE.

WILLIAM C. WOOLLEY AND DANIEL BEHMER, OF SANTA ROSA, CALIFORNIA.

PRUNING-SHEARS.

SPECIFICATION forming part of Letters Patent No. 393,197, dated November 20, 1888.

Application filed May 31, 1888. Serial No. 275,630. (No model.)

*To all whom it may concern:*

Be it known that we, WILLIAM C. WOOLLEY and DANIEL BEHMER, of Santa Rosa, Sonoma county, State of California, have invented an Improvement in Pruning-Shears; and we hereby declare the following to be a full, clear, and exact description of the same.

Our invention relates to certain improvements in pruning-shears; and it consists of a semicircular independent cutting-blade, with the central part pivoted to an extension of one of the handles, and the rear end having an anti-frictional roller with the other handle, and in combination with this of a rest for the limb or part to be cut bearing such a relation to the blade and its two fulcrums that when the jaws are closed a knee-lever action is produced and the power increased toward the finish of the cut, all as set forth in the claims.

Referring to the accompanying drawings for a more complete explanation of our invention, Figure 1 is a side view showing the jaws open. Fig. 2 is a side view showing the jaws closed. Fig. 3 is a modification of the device.

A and B are the two handles of a pruning-shears, hinged or fulcrumed together at C and having the extensions A' and B', as shown.

D is the cutting-blade, which is made with a convex or approximately semicircular cutting-edge. This blade is pivoted or fulcrumed to the extension A' at E, and has upon its rear end an anti-friction roller, F, which fits into a correspondingly-shaped slot, G, in the handle B; or, if preferred, a short link may be substituted for the roller, one end being pivoted to the rear end of the blade and the other to the extension B', as shown in Fig. 3, the effect being practically the same in both cases. Below the slot in which the roller F moves the extension B' has a concave rest, H, formed, against which the limb to be cut may rest. The position of this rest with relation to the fulcrum-points E and F is such that when the jaws are fully opened and a limb in place to be cut it will lie in the bottom or rear end of the concavity forming the rest, and when the jaws begin to move toward each other the rear portion of the cutting-edge of the blade presses against the limb. As the jaws close, the fulcrum-point E moves around the fulcrum-point C, the blade turning at the same time, so that the blade is pressed against the limb and the curved rest incloses the limb, so that a clean cut will be made and the limb will not be crushed or split. As the jaws are closed, the fulcrum-point E moves around the limb, as indicated by the dotted line drawn across the blade, until the limb is brought nearly into a line between the fulcrums E and C, the action being that of a knee-lever, and the cutting-power is thus gradually increased toward the finish of the cut instead of diminished, as in the case of ordinary shears, where the cut is commenced nearest the fulcrum and moves away from that point as it proceeds.

I is a spring, by which the handles are separated after they are relieved from pressure.

J is an elastic buffer to relieve the jar caused by closing the shears.

Having thus described our invention, what we claim as new, and desire to secure by Letters Patent, is—

1. The handles of a pruning-shears fulcrumed together and having extensions, as shown, a convex blade centrally fulcrumed to one of the extensions, a concave limb-rest upon the opposite extension in such relation to the two fulcrums that it is brought approximately between them by the closing of the jaws, and an anti-frictional roller between the rear end of the blade and opposite handle, substantially as herein described.

2. A pruning-shears consisting of the handle A, having the extension A', and the handle B, pivoted to the handle A and provided with the concave rest H and slot G, in combination with convex cutting-blade centrally pivoted to the extension of the handle A, and the anti-friction roller mounted on the rear of the blade and working in the slot in the handle B, substantially as herein described.

In witness whereof we have hereunto set our hands.

WILLIAM C. WOOLLEY.
DANIEL BEHMER.

Witnesses:
JAMES H. MCGEE,
W. H. MANION.